(12) United States Patent
Mizobata et al.

(10) Patent No.: US 9,776,572 B2
(45) Date of Patent: Oct. 3, 2017

(54) CONSOLE DEVICE

(71) Applicant: TOYOTA BOSHOKU KABUSHIKI KAISHA, Aichi-ken (JP)

(72) Inventors: Hiroshi Mizobata, Aichi-ken (JP);
Yasuhiro Kato, Aichi-ken (JP);
Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/208,357

(22) Filed: Jul. 12, 2016

(65) Prior Publication Data

US 2017/0080871 A1    Mar. 23, 2017

(30) Foreign Application Priority Data

Sep. 18, 2015  (JP) ................................. 2015-185827

(51) Int. Cl.
*B60R 7/04*      (2006.01)
*B60R 11/00*    (2006.01)
*B60H 1/24*     (2006.01)

(52) U.S. Cl.
CPC .............. *B60R 7/04* (2013.01); *B60H 1/246* (2013.01); *B60R 11/00* (2013.01); *B60R 2011/0007* (2013.01)

(58) Field of Classification Search
CPC ..... B60R 7/04; B60R 2011/0007; B60H 1/24; B60H 1/246
USPC ............... 296/208, 37.8, 37.14, 37.15, 24.34
See application file for complete search history.

(56) References Cited

U.S. PATENT DOCUMENTS

| | | | | |
|---|---|---|---|---|
| 3,356,409 A | * | 12/1967 | Belsky | B60N 2/4686 224/275 |
| 6,123,377 A | * | 9/2000 | Lecher | B60H 1/00985 180/315 |
| 6,231,098 B1 | * | 5/2001 | Schenk | B60R 7/04 224/400 |
| 6,250,729 B1 | * | 6/2001 | Allison | B60R 7/04 16/323 |
| 6,338,514 B1 | * | 1/2002 | Arold | B60H 1/00271 296/208 |
| 6,851,736 B1 | * | 2/2005 | Klopp, III | B60R 7/04 224/926 |
| 2009/0058120 A1 | * | 3/2009 | Ioka | B60H 1/0055 296/24.34 |
| 2009/0224564 A1 | * | 9/2009 | O'Brien | B60N 2/4686 296/37.8 |
| 2012/0088444 A1 | * | 4/2012 | Wittorf | B60H 1/00564 454/142 |
| 2017/0080871 A1 | * | 3/2017 | Mizobata | B60R 7/04 |

FOREIGN PATENT DOCUMENTS

JP          61-137010          8/1986

* cited by examiner

*Primary Examiner* — Gregory Blankenship
(74) *Attorney, Agent, or Firm* — Greenblum & Bernstein, P.L.C.

(57) ABSTRACT

A console device provided lateral to a vehicle seat on a vehicle floor, the console device includes a console box provided with a container portion having an open top and a lid provided on the console box to open and close the container portion. A clearance allowing conditioned air to flow out toward a person sitting on the seat is provided between an upper end of a lateral surface of the console box and a lateral end of the lid.

13 Claims, 7 Drawing Sheets

FIG. 9
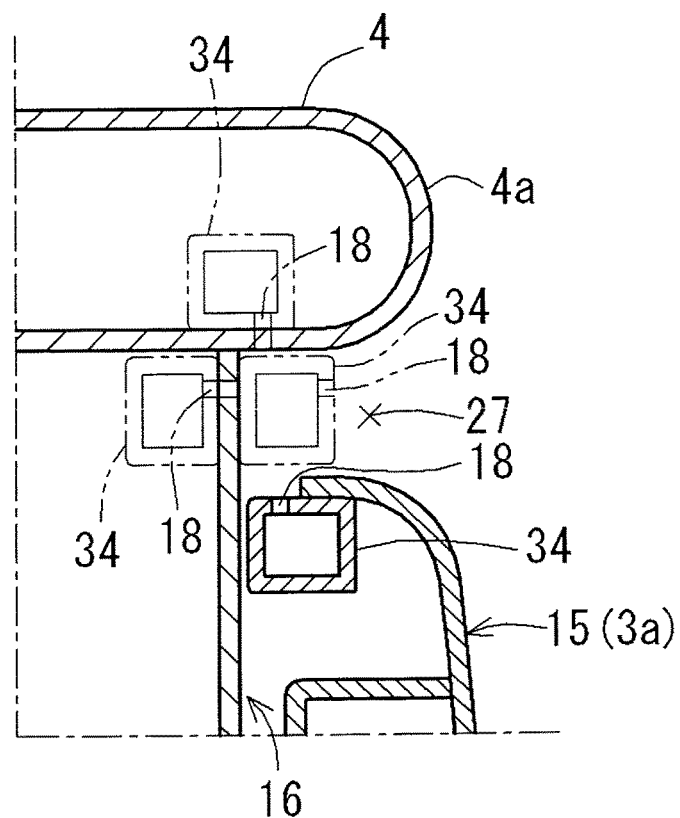
FIG. 10 [Related Art]
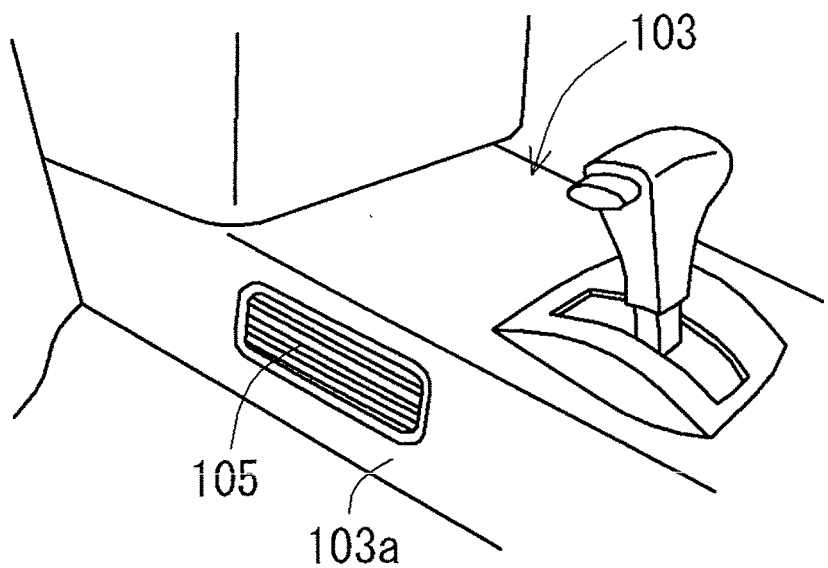

CONSOLE DEVICE

INCORPORATION BY REFERENCE

The present application claims priority under 35 U.S.C. §119 of Japanese Patent Application No. 2015-185827 filed on Sep. 18, 2015, the disclosure of which is expressly incorporated by reference herein in its entirety.

BACKGROUND

1. Technical Field

The present invention relates to a console device, and relates more particularly to a console device provided lateral to a vehicle seat on a vehicle floor.

2. Related Art

There has been widely known a conventional console device provided lateral to a vehicle seat on a vehicle floor (see Japanese Utility Model Application Publication No. S61-137010 and the like). It discloses a technique of providing an air outlet 105 allowing conditioned air to flow out, in a lateral surface 103a of a console box 103, as exemplarily depicted in FIG. 10. The air outlet 105 is positioned closer to a person sitting on a seat for higher air conditioning efficiency, in comparison to an air outlet provided at an instrument panel or the like.

According to the technique disclosed in Japanese Utility Model Application Publication No. S61-137010, the air outlet 105 is provided in the lateral surface 103a of the console box 103. A person sitting on a seat receives a flow of conditioned air too directly and has less comfort. Furthermore, it is necessary to fit a frame member or the like of the air outlet 105 to the lateral surface 103a of the console box 103, which leads to a complicated structure.

SUMMARY

In view of these current conditions, an object of an embodiment of the present invention is to provide a console device having a simple structure and configured to allow conditioned air to flow out without hitting a person sitting on a seat too directly.

One aspect of the present embodiments provides a console device provided lateral to a vehicle seat on a vehicle floor, the console device including: a console box provided with a container portion having an open top; and a lid provided on the console box to open and close the container portion; wherein a clearance allowing conditioned air to flow out toward a person sitting on the seat is provided between an upper end of a lateral surface of the console box and a lateral end of the lid.

In a further aspect, at least one of the console box or the lid may be provided with a duct allowing conditioned air to reach behind the seat and a rear seat air outlet allowing conditioned air supplied from the duct to flow out toward a rear seat, and the duct may be provided with at least one supply hole allowing conditioned air flowing in the duct to be supplied to the clearance.

In a further aspect, at least one of the upper end of the lateral surface of the console box or the lateral end of the lid may be provided with an arc portion having an arc outer periphery in a vertical section in a vehicle width direction.

In a further aspect, the console box may include a pair of side panel portions standing opposite to each other on the vehicle floor and each configuring the lateral surface of the console box, and a box body provided between the pair of side panel portions to be shiftable in a vehicle anteroposterior direction with respect to the vehicle floor and having the container portion.

In a further aspect, the clearance may be provided in a vehicle anteroposterior direction.

In a further aspect, the clearance may have a slit shape extending in a vehicle anteroposterior direction.

In a further aspect, the duct and the rear seat air outlet may be provided at the console box.

In a further aspect, the console box may include a pair of side panel portions standing opposite to each other on the vehicle floor and each configuring the lateral surface of the console box, and a box body provided between the pair of side panel portions to be shiftable in a vehicle anteroposterior direction with respect to the vehicle floor and having the container portion, the side panel portions each may include an outer panel configuring a design surface of the console box and an inner panel attached to an inner surface of the outer panel, the duct may be provided between the outer panel and the inner panel.

In a further aspect, the arc portion may shape the clearance expanding in a vehicle height direction toward an outer end in the vehicle width direction.

In a further aspect, the arc portion may be provided at each of the upper end of the lateral surface of the console box and the lateral end of the lid.

In a further aspect, the lid may be provided on the box body to open and close the container portion, the lateral end of the lid may project outward in the vehicle width direction from a lateral surface of the box body.

The console device according to the present embodiment includes a console box provided with a container portion having an open top, and a lid provided on the console box to open and close the container portion. There is a clearance between an upper end of a lateral surface of the console box and a lateral end of the lid, and the clearance allows conditioned air to flow out toward a person sitting on a seat. This structure allows conditioned air to diffuse and flow out of the clearance toward the person sitting on the seat. Conditioned air thus flows out without hitting the person sitting on the seat too directly. The console device is also simplified in the structure in comparison to a conventional console device including a frame member or the like of an air outlet fitted to a lateral surface of a console box.

In the case where at least one of the console box or the lid is provided with a duct and a rear seat air outlet and the duct is provided with a supply hole, conditioned air supplied from the duct to a person sitting on a rear seat is flown out of the air outlet for the rear seat, whereas conditioned air supplied from the supply hole of the duct to a person sitting on a seat is flown out of the clearance. The duct for the rear seat air outlet allows conditioned air to be supplied to the clearance, with no need to provide a separate duct.

In the case where at least one of an upper end of a lateral surface of the console box or a lateral end of the lid has an arc portion, conditioned air flown out of a clearance flows along the arc portion due to the Coanda effect. Conditioned air is thus flown out of the clearance while diffusing in a vehicle height direction.

In the case where the console box includes the pair of side panel portions and the box body, the lid is adjusted in position in the vehicle anteroposterior direction by shifting the box body and the lid in the vehicle anteroposterior direction. Furthermore, the clearance is configured by a space provided for shifting the box body and the lid with respect to the side panel portions to flow a conditioned air therethrough.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 8A depicts a state where an arc portion is provided only at a console box and FIG. 8B depicts a state where an arc portion is provided only at a lid;

FIG. 9 is a sectional view of a main part of a console device according to still another embodiment; and FIG. 10 is an explanatory view of a conventional console device.

DETAILED DESCRIPTION

Figure 1:
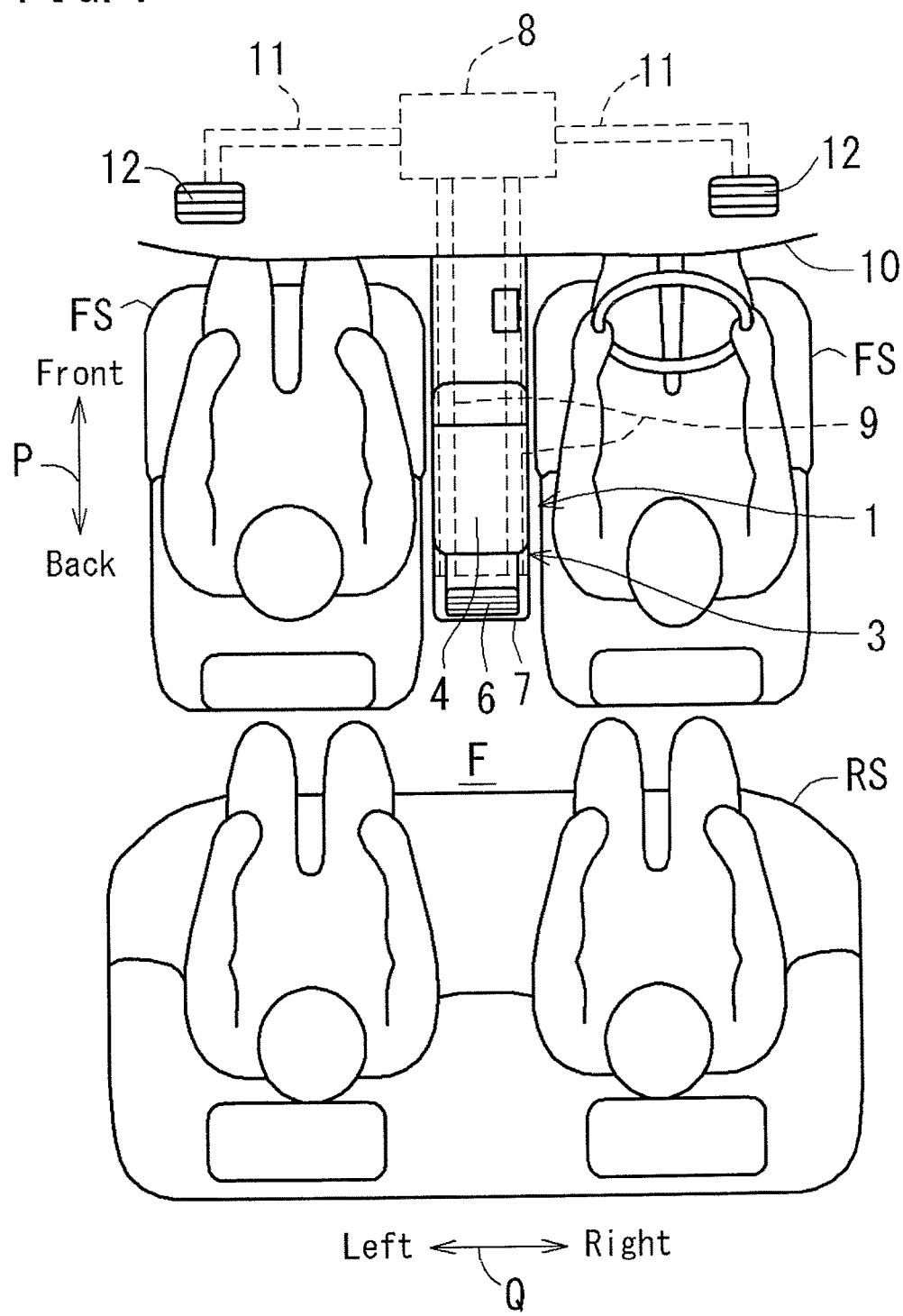
FIG. 1 is a plan view from above, of the interior of a vehicle chamber including a console device according to an example.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

<Console Device>

A console device (1) according to the present embodiment is provided lateral to a vehicle seat (FS) on a vehicle floor (F), and includes a console box (3) provided with a container portion (13) having an open top, and a lid (4) provided on an upper part of the console box to open and close the container portion (see FIGS. 1 to 4 and the like). A clearance (27) is provided between an upper end of each lateral surface (3a) of the console box (3) and each lateral end (4a) of the lid (4), and the clearance (27) allows conditioned air to flow out toward a person sitting on the seat (FS) (see FIG. 5 and the like).

The clearance (27) is not particularly limited in terms of its size and shape, the number thereof, and the like. In view of diffusibility in a vehicle anteroposterior direction (P) of conditioned air, the clearance (27) provided in the vehicle anteroposterior direction (P) is preferable (see FIG. 3 and the like). The clearance (27) having a slit shape extending in the vehicle anteroposterior direction (P) is more preferable. In addition, for example, at least one of the console box (3) or the lid (4) may be provided with a duct (9) for supplying conditioned air to the clearance (27).

Figure 3:
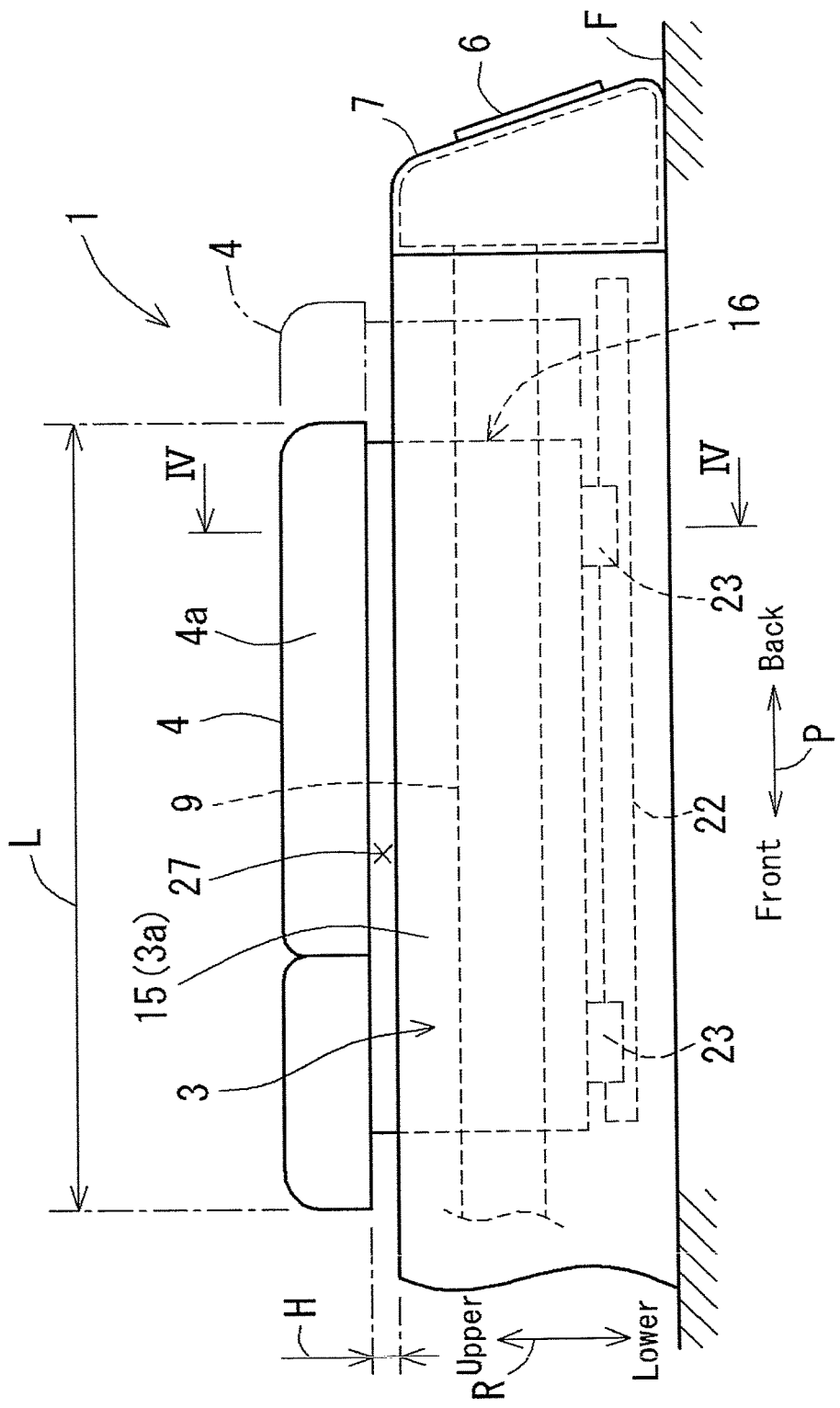
FIG. 3 is a side view of the console device.
Figure 4:
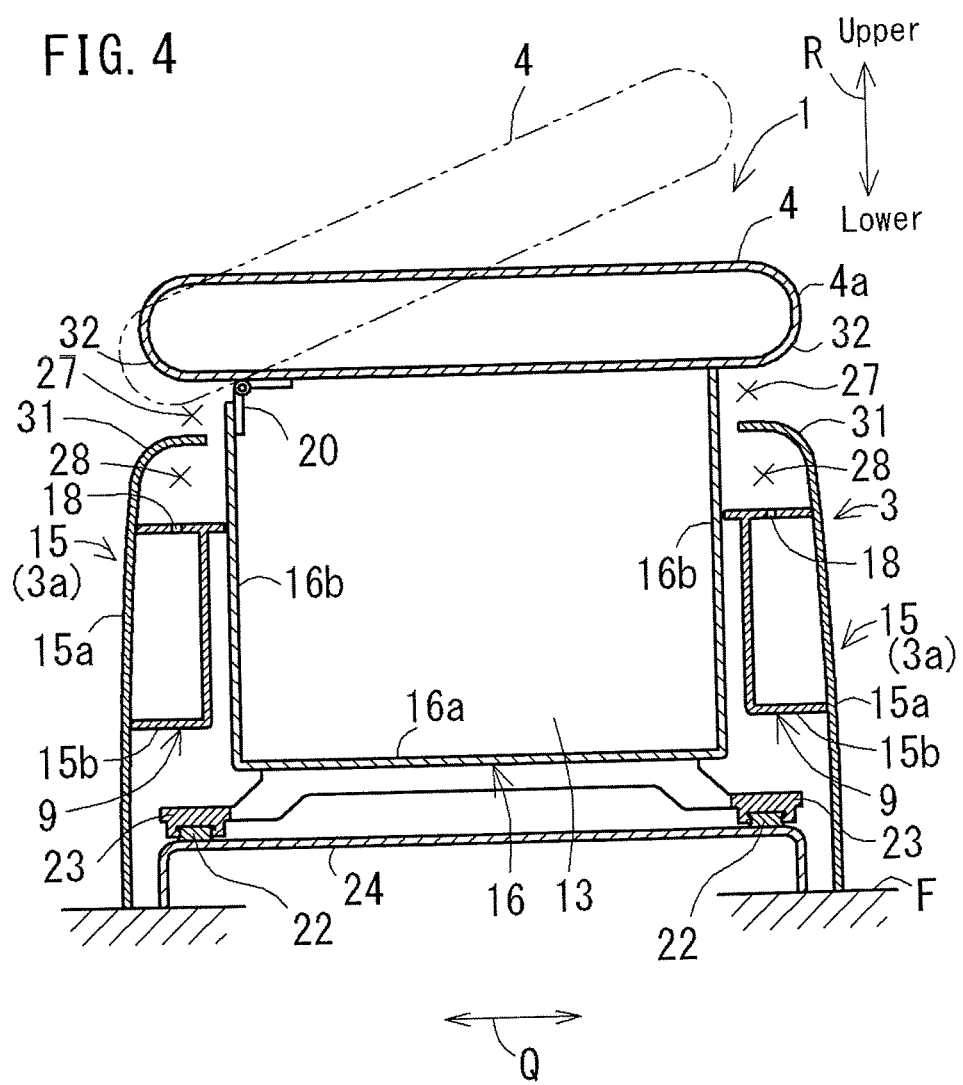
FIG. 4 is an enlarged sectional view taken along line IV-IV indicated in FIG. 3.

As to the console device of the present embodiment, at least one of the console box (3) or the lid (4) is provided with the duct (9) allowing conditioned air to reach behind the seat (FS), as well as a rear seat air outlet (6) allowing conditioned air supplied from the duct (9) to flow out toward a rear seat (RS), and the duct (9) is provided with at least one supply hole (18) allowing conditioned air flowing in the duct (9) to be supplied to the clearance (27) (see FIGS. 3, 4, and the like).

Figure 6:
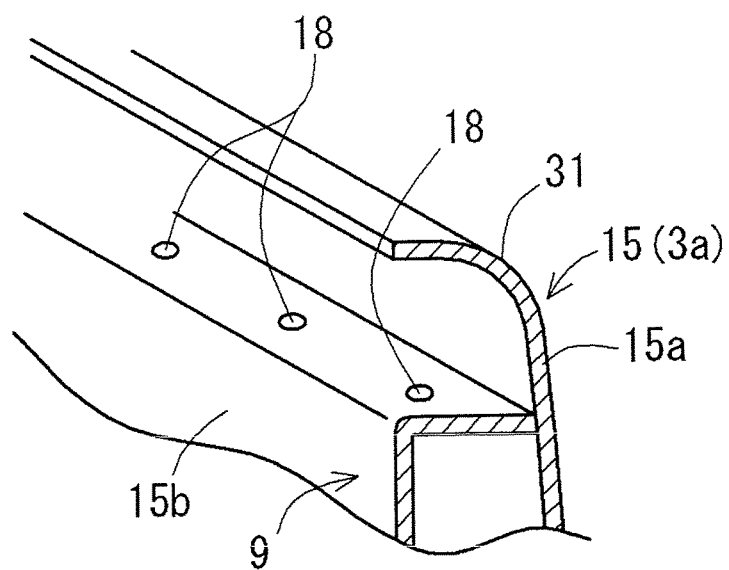
FIG. 6 is a perspective view of a main part of a side panel portion according to the example.

The supply hole (18) is not particularly limited in terms of its size and shape, the number thereof, and the like. In view of diffusibility of conditioned air, a plurality of supply holes (18) provided with aligned in a longitudinal direction of the duct (9) (see FIG. 6 and the like) is preferable.

Figure 5:
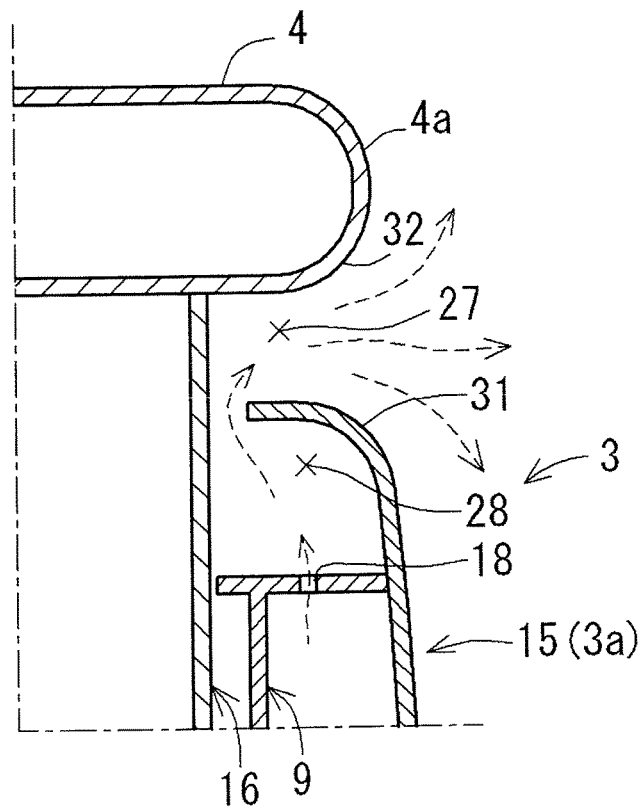
FIG. 5 is an enlarged view of a main part depicted in FIG. 4.
Figure 8A:
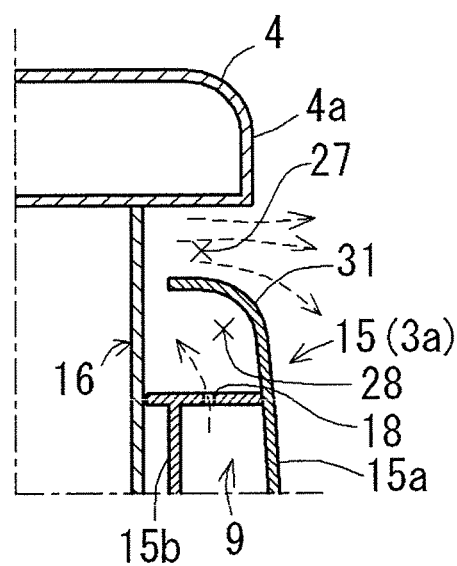
FIGS. 8A and 8B are each a sectional view of a main part of a console device according to another embodiment, specifically.
Figure 8B:
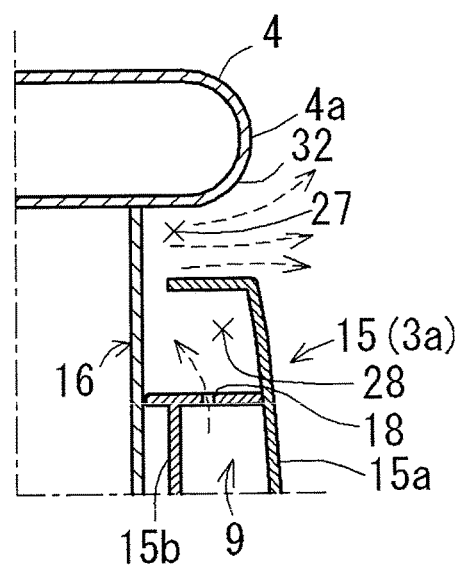

The console device according to the present embodiment is exemplarily configured such that at least one of the upper end of the lateral surface (3a) of the console box (3) or the lateral end (4a) of the lid (4) is provided with an arc portion (31, 32) having an arc outer periphery in a vertical section in a vehicle width direction (Q) (see FIGS. 5, 8A, 8B, and the like).

The console device according to the present embodiment is exemplarily configured such that the console box (3) includes a pair of side panel portions (15) standing opposite to each other on the vehicle floor (F) and configuring the lateral surfaces (3a) of the console box (3), and a box body (16) provided between the pair of side panel portions to be shiftable in the vehicle anteroposterior direction (P) with respect to the vehicle floor and having the container portion (13) (see FIG. 4 and the like). The lateral end (4a) of the lid (4) may project outward in the vehicle width direction (Q) from a lateral surface of the box body (16).

The parenthesized reference numerals of various elements in the embodiments described above indicate the corresponding relationships with specific elements mentioned in embodiments to be described later.

Hereinafter, the present invention will be explained in specific terms through description of embodiments with reference to the drawings.

(1) Configuration of Console Device

Figure 2:
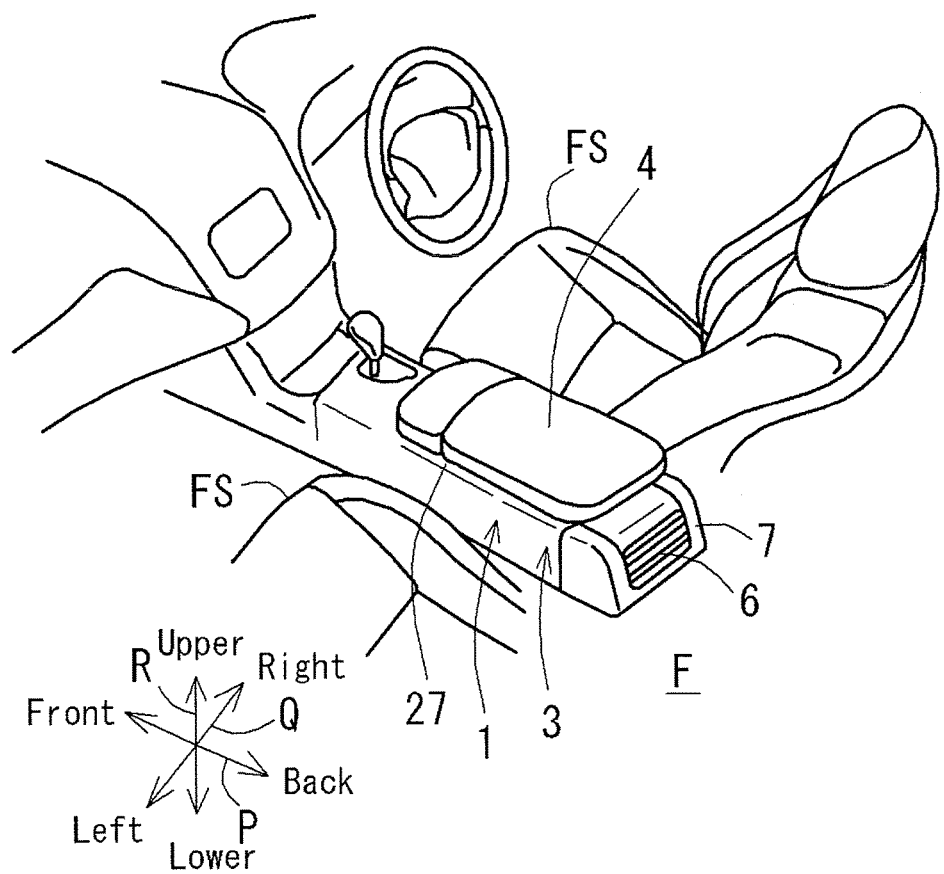
FIG. 2 is a perspective view from above, of the interior of the vehicle chamber including the console device.

As depicted in FIGS. 1 and 2, a console device 1 according to the present example is provided on a vehicle floor F between right and left front seats FS (each exemplified by the "seat" according to the present invention) in a first row in the vehicle. As depicted in FIG. 4, the console device 1 includes a console box 3 provided with a container portion 13 having an open top, and a lid 4 provided on the console box 3 to open and close the opening of the container portion 13. The console box 3 has a container function of containing a small item or the like. The lid 4 has, in addition to the function of opening and closing the container portion 13, an arm rest function for a person sitting on one of the front seats (mainly a driver).

As depicted in FIGS. 1 and 2, the console box 3 is provided therebehind with a register case 7 having a rear seat air outlet 6. The rear seat air outlet 6 is configured to be opened and closed by an open/close mechanism (e.g. a fin mechanism) (not depicted). The register case 7 is connected with a duct 9 communicating with a vehicle air conditioner 8. Air conditioned by the vehicle air conditioner 8 (e.g. cooled air or heated air) is supplied into the register case 7 through the duct 9 and is thus flown out of the rear seat air outlet 6 toward a person sitting on a rear seat RS.

An instrument panel 10 or the like is provided with a front seat register 12 that allows conditioned air supplied from the vehicle air conditioner 8 through a duct 11 to flow out toward a person sitting on corresponding one of the front seats FS. The vehicle air conditioner 8 typically utilizes a compressor for cooling air, and utilizes engine waste heat, an electric heater, or the like for heating air.

As depicted in FIGS. 3 and 4, the console box 3 includes a pair of side panel portions 15 standing opposite to each other on the vehicle floor F and each configuring a lateral surface 3a of the console box, and a box body 16 provided between the pair of side panel portions 15 to be shiftable in a vehicle anteroposterior direction P.

The side panel portions 15 each include an outer panel 15a configuring a design surface of the console box 3, and an inner panel 15b attached to an inner surface of the outer panel 15a. The outer panel 15a is sized to cover a lateral surface of the box body 16 in a shift range in the vehicle anteroposterior direction P of the box body 16. The inner panel 15b has a substantially cornered U shape in a vertical section. The duct 9 is configured between the outer panel 15a and the inner panel 15b. The console box 3 is provided with the duct 9 allowing conditioned air to reach behind corresponding one of the front seats FS. The inner panel 15b has an upper wall provided with at least one supply hole 18 that allows conditioned air flowing in the duct 9 to be supplied to a clearance 27 to be described later. A plurality of supply holes 18 is provided with aligned at predetermined intervals in a longitudinal direction of the duct 9 (see FIG. 6).

As depicted in FIG. 4, the box body 16 includes a bottom wall 16a and a standing wall 16b standing from a peripheral edge of the bottom wall 16a, and has the container portion 13 described above. In addition, the lid 4 is provided at an upper part of the box body 16 through a hinge structure 20 so as to be rotatable about an axis in the vehicle anteroposterior direction P. The lid 4 rotates to open and close the opening of the container portion 13. The lid 4 has a lateral end 4a projecting outward in a vehicle width direction Q from the standing wall 16b configuring the lateral surface of the box body 16, and covers an upper end of a corresponding one of the side panel portions 15.

As depicted in FIGS. 3 and 4, sliders 23 supported by right and left rails 22 extending in the vehicle anteroposterior direction P are provided slidably at lower part of the box body. These rails 22 are attached onto a base plate 24 disposed on the vehicle floor F. When the sliders 23 are slid along the rails 22 each by a slide driving mechanism (e.g. an electromotive ball screw mechanism) (not depicted), the box body 16 is slid within the predetermined shift range in the vehicle anteroposterior direction P.

There is provided the clearance 27 between an upper end of the lateral surface 3a (i.e. the side panel portion 15) of the console box 3 and the lateral end 4a of the lid 4, and the clearance 27 allows conditioned air to flow out toward a person sitting on corresponding one of the front seats FS. The upper end of the side panel portion 15 and the lateral end 4a of the lid 4 face each other in a vehicle height direction R with the clearance 27 provided therebetween. The clearance 27 has a slit shape extending in the vehicle anteroposterior direction P. Specifically, the clearance 27 has a length in the vehicle anteroposterior direction P of a predetermined value L and a height in the vehicle height direction R of a predetermined value H (see FIG. 3). The clearance 27 communicates with the supply holes 18 via a communication path 28 provided between the upper end of the side panel portion 15 (specifically, upper ends of the outer panel 15a and the inner panel 15b) and the standing wall 16b configuring the lateral surface of the box body 16. Conditioned air flowing in the duct 9 is thus partially supplied from the supply holes 18 to the clearance 27 through the communication path 28.

As depicted in FIG. 5, the upper end of the side panel portion 15 (specifically, the upper end of the outer panel 15a) and the lateral end 4a of the lid 4 are provided with arc portions 31 and 32, respectively, each of which has an arc outer periphery in a vertical section in the vehicle width direction Q. The arc portions 31 and 32 shape the clearance 27 expanding in the vehicle height direction R toward an outer end in the vehicle width direction Q. The arc portions 31 and 32 each have a radius of curvature sized to allow conditioned air flown out of the clearance 27 to flow along the arc portions 31 and 32 due to the Coanda effect.

(2) Operation of Console Device

Figure 7:
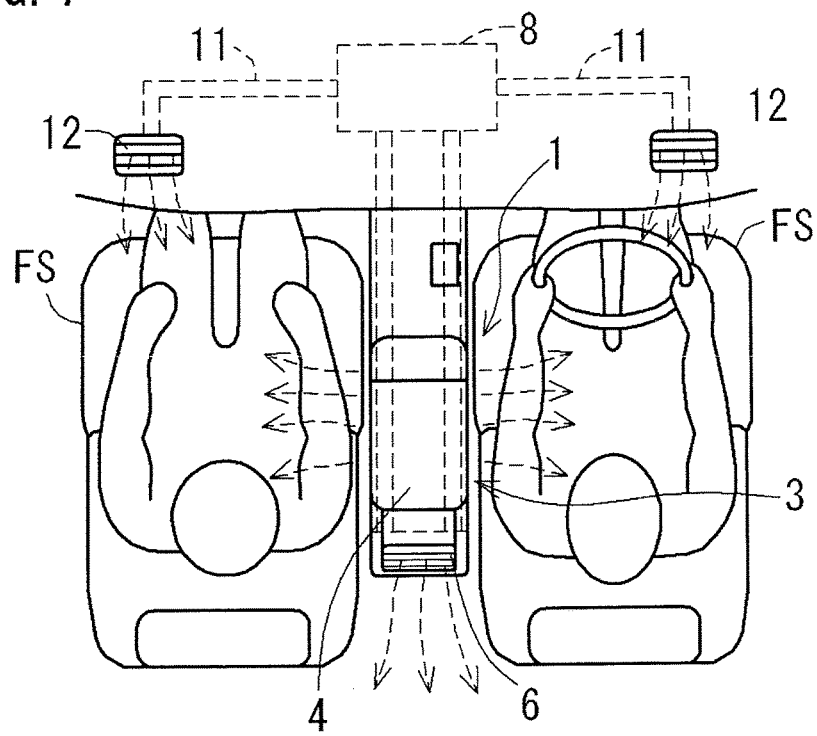
FIG. 7 is an operation explanatory view of the console device.

Described next is operation of the console device 1 configured as described above. In a case where there is a person sitting on the rear seat RS, as depicted in FIG. 7, conditioned air is flown out of the rear seat air outlet 6 backward toward the person sitting on the rear seat RS. Furthermore, conditioned air is supplied from the supply holes 18 of the duct 9 to the clearance 27 through the communication path 28 and is flown out of the clearance 27 in the vehicle width direction Q toward a person sitting on corresponding one of the front seats FS. As depicted in FIG. 5, conditioned air flown out of the clearance 27 flows along the arc portions 31 and 32 to be diffused uniformly in the vehicle height direction R. In a case where there is no person sitting on the rear seat RS, the rear seat air outlet 6 is closed to inhibit conditioned air from flowing out of the rear seat air outlet 6, and the conditioned air is flown out of the clearance 27 through the supply holes 18 of the duct 9 and the communication path 28.

(3) Effects of Example

The console device 1 according to the present example includes the console box 3 provided with the container portion 13 having the open top, and the lid 4 provided on the console box 3 to open and close the container portion 13. There is the clearance 27 between the upper end of the lateral surface 3a of the console box 3 and the lateral end 4a of the lid 4, and the clearance 27 allows conditioned air to flow out toward a person sitting on corresponding one of the seats FS. This structure allows conditioned air to diffuse and flow out of the clearance 27 toward a person sitting on the seat FS. Conditioned air thus flows out without hitting the person sitting on the seat FS too directly. The console device is also simplified in a structure in comparison to a conventional console device including a frame member or the like of an air outlet fitted to a lateral surface of a console box.

The clearance 27 according to the present example extends in the vehicle anteroposterior direction P. This achieves excellent diffusibility in the vehicle anteroposterior direction of conditioned air. In particular, the clearance 27 according to the present example has the slit shape extending in the vehicle anteroposterior direction P to achieve excellent diffusibility in the vehicle anteroposterior direction of conditioned air.

The console box 3 according to the present example is provided with the duct 9 and the rear seat air outlet 6, and the duct 9 has the at least one supply hole 18. In this structure, conditioned air supplied from the duct 9 to a person sitting on the rear seat RS is flown out of the rear seat air outlet 6, whereas conditioned air supplied from the supply hole 18 of the duct 9 to the person sitting on the seat FS is flown out of the clearance 27. The duct 9 for the rear seat air outlet 6 allows conditioned air to be supplied to the clearance 27, with no need to provide a separate duct. In particular, a plurality of supply holes 18 according to the present example is aligned in the longitudinal direction of the duct 9 to achieve excellent diffusibility of conditioned air.

According to the present example, the upper end of the side panel portion 15 and the lid 4 are provided with the arc portions 31 and 32, respectively. Conditioned air flown out of the clearance 27 flows along the arc portions 31 and 32 due to the Coanda effect. Conditioned air is thus flown out of the clearance 27 while diffusing in the vehicle height direction R.

The console box 3 according to the present example includes the pair of side panel portions 15 and the box body 16. The box body 16 and the lid 4 are shifted in the vehicle anteroposterior direction P to adjust a position in the vehicle anteroposterior direction P of the lid 4 (i.e. an arm rest 4). Furthermore, the clearance 27 is configured by a space provided for shifting the box body 16 and the lid 4 with respect to the side panel portions 15 to flow conditioned air therethrough.

The present invention is not limited to the example described above but will include examples with various modifications according to purposes and intended uses within the scope of the present invention. Specifically, the above example discloses the clearance 27 having the slit shape extending in the vehicle anteroposterior direction P. The present invention is not limited to this example, and a plurality of clearances may be alternatively provided in the vehicle anteroposterior direction P.

The above example discloses the case where the upper end of the side panel portion 15 (i.e. the lateral surface 3a of the console box 3) and the lateral end 4a of the lid 4 have the arc portions 31 and 32, respectively. The present invention is not limited to this example, and alternatively, only the upper end of the side panel portion 15 may have the arc portion 31 (see FIG. 8A) or only the lateral end 4a of the lid 4 may have the arc portion 32 (see FIG. 8B). Alternatively, both the upper end of the side panel portion 15 and the lateral end 4a of the lid 4 may not have any arc portion.

The console box 3 according to the above example is provided with the duct 9 and the rear seat air outlet 6. The present invention is not limited to this example, and the lid 4 may alternatively be provided with a duct and a rear seat air outlet in place of or in addition to the duct 9 and the rear seat air outlet 6 of the console box 3.

The duct 9 allowing conditioned air to be supplied to the rear seat air outlet 6 enables conditioned air to be supplied to the clearance 27 in the above example. The present invention is not limited to this example, and the duct 9 may be alternatively dedicated to supply of conditioned air to the clearance 27. Furthermore, a dedicated duct may alternatively be provided separately from the duct 9 to supply conditioned air to the clearance 27. In this case, as exemplarily depicted in FIG. 9, a dedicated duct 34 having a supply hole 18 may be provided between the side panel portion 15 and the box body 16. In addition, as indicated by virtual lines in FIG. 9, the dedicated duct 34 may be provided along the clearance 27, inside the box body 16, or inside the lid 4.

The above example discloses the console box 3 having the box body 16 that is shiftable in the vehicle anteroposterior direction P (e.g. the horizontal direction, a direction slanted from the horizontal direction and the like) with respect to the vehicle floor F. The present invention is not limited to this example, and the console box may alternatively include a box body that is not shiftable with respect to the vehicle floor F.

The above example discloses the lid 4 having the arm rest function. The present invention is not limited to this example, and the lid may alternatively have no arm rest function. The above example discloses the lid 4 provided rotatably with respect to the box body 16. The present invention is not limited to this example, and the lid may alternatively be provided slidably with respect to the box body 16.

The above example discloses the console device 1 provided lateral to the front seats FS in the first row in the vehicle. The present invention is not limited to this example, and the console device may alternatively be provided lateral to a rear seat in a second or subsequent row in the vehicle.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

The present invention is widely applicable as a technique relating to a console device having a function of flowing out conditioned air toward a person sitting on a seat in passenger vehicles, buses, and trucks, as well as railway vehicles such as steam trains and electric trains, construction vehicles, agricultural vehicles, industrial vehicles, and aircrafts.

What is claimed is:

1. A console device provided lateral to a vehicle seat on a vehicle floor, the console device comprising:
   a console box provided with a container portion having an open top; and
   a lid provided on the console box to open and close the container portion, wherein
   a clearance allowing conditioned air to flow out toward a person sitting on the seat is provided between an upper end of a lateral surface of the console box and a lateral end of the lid, and
   a communication path is provided adjacent to the clearance and outside of an interior of the container portion, the communication path being configured to supply the conditioned air to the clearance.

2. The console device according to claim 1, wherein
   at least one of the console box and the lid is provided with
   a duct allowing conditioned air to reach behind the seat and a rear seat air outlet allowing conditioned air supplied from the duct to flow out toward a rear seat, and
   the duct is provided with at least one supply hole allowing conditioned air flowing in the duct to be supplied to the clearance.

3. The console device according to claim 1, wherein
   at least one of the upper end of the lateral surface of the console box and the lateral end of the lid is provided with an arc portion having an arc outer periphery in a vertical section in a vehicle width direction.

4. The console device according to claim 2, wherein at least one of the upper end of the lateral surface of the console box and the lateral end of the lid is provided with an arc portion having an arc outer periphery in a vertical section in a vehicle width direction.

5. The console device according to claim 1, wherein the console box includes a pair of side panel portions standing opposite to each other on the vehicle floor and each provide the lateral surface of the console box, and a box body provided between the pair of side panel portions to be shiftable in a vehicle anteroposterior direction with respect to the vehicle floor and having the container portion.

6. The console device according to claim 1, wherein the clearance is provided in a vehicle anteroposterior direction.

7. The console device according to claim 6, wherein the clearance has a slit shape extending in the vehicle anteroposterior direction.

8. The console device according to claim 2, wherein the duct and the rear seat air outlet are provided at the console box.

9. The console device according to claim 3, wherein the arc portion shapes the clearance expanding in a vehicle height direction toward an outer end in the vehicle width direction.

10. The console device according to claim 9, wherein the arc portion is provided at each of the upper end of the lateral surface of the console box and the lateral end of the lid.

11. The console device according to claim 1, wherein at least one of the console box and the lid is provided with a duct having at least one supply hole allowing conditioned air flowing in the duct to be supplied to the clearance via the communication path.

12. A console device provided lateral to a vehicle seat on a vehicle floor, the console device comprising:
a console box provided with a container portion having an open top, the console box including:
a pair of side panel portions standing opposite to each other on the vehicle floor that provide a lateral surface of the console box, the side panel portions each include an outer panel that provide a design surface of the console box and an inner panel attached to an inner surface of the outer panel; and
a box body provided between the pair of side panel portions to be shiftable in a vehicle anteroposterior direction with respect to the vehicle floor and having the container portion; and
a lid provided on the console box to open and close the container portion, wherein
a clearance allowing conditioned air to flow out toward a person sitting on the seat is provided between an upper end of the lateral surface of the console box and a lateral end of the lid, wherein
at least one of the console box and the lid is provided with a duct allowing conditioned air to reach behind the seat and a rear seat air outlet allowing conditioned air supplied from the duct to flow out toward a rear seat, the duct is provided between the outer panel and the inner panel, the duct is provided with at least one supply hole allowing conditioned air flowing in the duct to be supplied to the clearance, and
the duct and the rear seat air outlet are provided at the console box.

13. A console device provided lateral to a vehicle seat on a vehicle floor, the console device comprising:
a console box provided with a container portion having an open top, the console box including:
a pair of side panel portions standing opposite to each other on the vehicle floor that provide a lateral surface of the console box; and
a box body provided between the pair of side panel portions to be shiftable in a vehicle anteroposterior direction with respect to the vehicle floor and having the container portion; and
a lid provided on the console box to open and close the container portion, wherein
a clearance allowing conditioned air to flow out toward a person sitting on the seat is provided between an upper end of a lateral surface of the console box and a lateral end of the lid,
the lid is provided on the box body to open and close the container portion, and
the lateral end of the lid projects outward in the vehicle width direction from a lateral surface of the box body.

* * * * *